(12) United States Patent
Yoo et al.

(10) Patent No.: US 6,919,408 B1
(45) Date of Patent: Jul. 19, 2005

(54) THERMOPLASTIC TRANSPARENT RESIN COMPOSITION AND METHOD OF MANUFACTURING SAME

(75) Inventors: Keon-Hoon Yoo, Daejeon (KR); Yang-Hyun Shin, Yochon (KR); Chan-Hong Lee, Daejeon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/581,804

(22) PCT Filed: Mar. 4, 1999

(86) PCT No.: PCT/KR99/00101

§ 371 (c)(1),
(2), (4) Date: Jun. 16, 2000

(87) PCT Pub. No.: WO00/26298

PCT Pub. Date: May 11, 2000

(30) Foreign Application Priority Data

Oct. 29, 1998 (KR) ............................. 98-45699

(51) Int. Cl.$^7$ ................................. C08L 9/10
(52) U.S. Cl. .................. 525/236; 525/238; 525/241; 525/222; 523/220; 523/221; 523/202; 523/206
(58) Field of Search ................ 525/236, 244, 525/243

(56) References Cited

U.S. PATENT DOCUMENTS

| | | | | |
|---|---|---|---|---|
| 3,787,522 A | | 1/1974 | Dickie et al. ............... | 260/836 |
| 3,855,355 A | * | 12/1974 | Moore ........................ | 525/316 |
| 3,880,786 A | * | 4/1975 | Feast et al. ................. | 525/262 |
| 4,228,256 A | | 10/1980 | Schmitt ...................... | 525/302 |
| 4,242,469 A | | 12/1980 | Schmitt et al. .............. | 525/71 |
| 4,520,165 A | * | 5/1985 | Zabrocki et al. ............. | 525/84 |
| 4,581,408 A | * | 4/1986 | Trabert et al. ............... | 525/66 |
| 4,703,090 A | * | 10/1987 | Ferraresi et al. ............ | 525/246 |
| 4,767,833 A | * | 8/1988 | Yumoto et al. ............. | 525/193 |
| 5,071,946 A | * | 12/1991 | Schmidt et al. ............. | 528/306 |
| 5,200,441 A | * | 4/1993 | Kim et al. ................... | 523/221 |
| 5,225,494 A | * | 7/1993 | Ishiga ........................ | 525/316 |
| 6,080,815 A | * | 6/2000 | Lee et al. ..................... | 525/66 |

FOREIGN PATENT DOCUMENTS

| | | | | |
|---|---|---|---|---|
| EP | 0703252 | | 3/1996 | |
| JP | 56-41216 A | * | 4/1981 | ......... C08F/279/00 |
| JP | 56-041 216 | | 4/1981 | |
| JP | 56-136807 | | 10/1981 | |
| JP | 62-086 046 | | 4/1987 | |
| WO | WO 00/26298 A1 | * | 11/2000 | ........... C08L/33/06 |

OTHER PUBLICATIONS

"*Asahi's Synthetic Rubber for HIPS, MBS, and Mass–ABS, Asahi Kasei Corporation,*" Table titled "Asahi's Synthetic Rubber".

*Bayer Buna CB–Buna BL–Taktene*, Table titled "Bayer BR/BL/SL Product Range: Plastic Grades".

"Toughened Plastics" by C. B. Bucknall, Department of Materials, Cranfield Institute of Technology, Cranfield, Bedford, England; *Applied SciencePublisheers Ltd.*, London, p. 296.

* cited by examiner

*Primary Examiner*—David W. Wu
*Assistant Examiner*—Rip A Lee
(74) *Attorney, Agent, or Firm*—Baker Botts LLP

(57) ABSTRACT

Disclosed is a thermoplastic transparent resin composition and a method for manufacturing the same. The resin composition includes 3–15 parts by weight of small aperture polybutadiene rubber latex; 5–25 parts by weight of large aperture polybutadiene rubber latex; 40–70 parts by weight of a methacrylic acid alkylester compound or an acrylic acid alkylester compound; 15–30 parts by weight of an aromatic vinyl compound; and 1–20 parts by weight of a vinylcyan compound. The method includes the steps of a) producing a small aperture polybutadiene rubber latex having an average particle diameter of 600–1500 A, a gel content of 70–95%, and a swelling index of 12–30 by reacting butadiene at 55–70° C. using a polymerization initiator, b) producing a large aperture polybutadiene rubber latex having a particle diameter of 2600–5000 A, a gel content of 70–95%, and a swelling index of 12–30 by enlarging the small aperture polybutadiene rubber latex particles; c) performing graft copolymerization at 65–80° C. by continuously or separately adding 3–15 parts by weight of the small aperture polybutadiene rubber latex of step a), 5–25 parts by weight of the large aperture polybutadiene rubber latex of step b), 40–70 parts by weight of a methacrylic acid alkylester compound or an acrylic acid alkylester compound, 15–30 parts by weight of an aromatic vinyl compound, and 1–20 parts by weight of a vinylcyan compound.

9 Claims, No Drawings

THERMOPLASTIC TRANSPARENT RESIN COMPOSITION AND METHOD OF MANUFACTURING SAME

CROSS-REFERENCE TO RELATED APPLICATIONS

This application is a national phase application of International Application No. PCT/KR99/00101, which was filed on Mar. 4, 1999 and which published in English on May 11, 2000, which in turn claims priority from Korean Application No. 1998-45699, which was filed on Oct. 29, 1998.

BACKGROUND OF THE INVENTION (a) Field of the Invention

The present invention relates to a thermoplastic transparent resin composition, and more particularly, to a thermoplastic transparent resin composition which is resistant to shocks, chemically resistant, easily processed, and highly transparent. The present invention also relates to a method for manufacturing the thermoplastic transparent resin composition in which, when performing graft copolymerization of a methacrylic acid or an acrylic alkylester compound, an aromatic vinyl compound, and a vinylcian compound in a mixture of a small aperture polybutadiene rubber latex and a large aperture polybutadiene rubber latex, both having a suitable gel content, a refraction coefficient is maximized by controlling the mixture ratio of these monomers, thereby realizing the advantages of the resin composition stated above.

(b) Description of the Related Art

Many various products today use transparent plastic parts for both practical reasons and to provide distinguishable characteristics to a product. Examples include the plastic screen cover on a cell phone, a washing machine cover that enables the user to view the contents being washed, portions of the housing of a PC monitor, pager housings, the housings and covers of home appliances, etc. However, the typically used ABS (acrylonitrile-butadiene styrene) copolymer resin, although providing good shock resistance, chemical resistance, processability, and surface gloss, has limited transparency.

The following are some of the methods for providing transparency in plastic materials:

1) A method using transparent polycarbonate resin.

2) A method of providing shock resistance to transparent PMMA polymethylmethacrylate) resin (U.S. Pat. No. 3,787,522, Japanese Patent No. Sho 63-42940).

3) A method of providing transparency to HIPS (high impact polystyrene) resin (European Patent No. 0,703,252).

However, in the method of using polycarbonate resin, although this material has good transparency and shock resistance at room temperature, it is not highly resistant to chemicals and does not display high resistance to shocks at low temperatures. This material also has problems related to processability, making it difficult to manufacture this product to large sizes. With regard to PMMA resin, though providing good transparency and processability, this material has an extremely low level of resistance against shocks. Finally, regarding HIPS resin, this material has a low level of resistance against chemicals and is easily scratched.

U.S. Pat. No. 4,767,833, in an effort to solve the above problems, discloses a transparent resin in which monomers such as methylmethacrylate, styrene and acrylonitrile are graft copolymerized in SBR (styrene-butadiene rubber) latex such that properties of shock resistance, chemical resistance, and processability are realized. However, this resin is limited in its resistance to shocks at low temperatures and displays a limited degree of transparency.

SUMMARY OF THE INVENTION

The present invention has been made in an effort to solve the above problems.

It is an object of the present invention to provide a thermoplastic transparent resin composition and a method of manufacturing the same in which the resin composition displays high resistance to shocks at both room temperature and low temperatures, high chemical resistance, good processability, high surface gloss, and excellent transparency.

To achieve the above object the present invention provides a thermoplastic transparent resin composition comprising 3–15 parts by weight of small aperture polybutadiene rubber latex, 5–25 parts by weight of large aperture polybutadiene rubber latex, 40–70 parts by weight of a methacrylic acid alkylester compound or an acrylic acid alkylester compound, 15-30 parts by weight of an aromatic vinyl compound, and 1–20 parts by weight of a vinylcian compound.

Further, the present invention provides a method of manufacturing a thermoplastic transparent resin composition including the steps of a) producing a small aperture polybutadiene rubber latex having an average particle diameter of 600–1500 Å, a gel content of 70–95%, and a swelling index of 12–30 by reacting butadiene at 55–70° C. using a polymerization initiator, b) producing a large aperture polybutadiene rubber latex having a particle diameter of 2600–5000 Å, a gel content of 70–95%, and a swelling index of 12–30 by enlarging the small aperture polybutadiene rubber latex particles, and c) performing graft copolymerization at 65–80° C. by continuously or separately adding 3–15 parts by weight of the small aperture polybutadiene rubber latex of step a), 5–25 parts by weight of the large aperture polybutadiene rubber latex of step b), 40–70 parts by weight of a methacrylic acid alkylester compound or an acrylic acid alkylester compound, 15–30 parts by weight of an aromatic vinyl compound, and 1–20 parts by weight of a vinylcian compound.

DETAILED DESCRIPTION OF THE PRESENT INVENTION

In the present invention, when producing an ABS resin comprised of acrylonitrile having high chemical resistance, butadiene having good resistance to shocks, and styrene providing good processability, methylmethacrylate is introduced, and by controlling a content and mixture ratio of each component, a refraction coefficient of polybutadiene rubber latex and a refraction coefficient of a mixture of the methymethacrylate, styrene, and acrylonitrile, grafted in the rubber latex, are maximized. Accordingly, a thermoplastic transparent resin is manufactured having high levels of shock resistance, chemical resistance, and processability, in addition to excellent transparency.

The thermoplastic transparent resin composition of the present invention is manufactured by graft copolymerizing, using an emulsion polymerization method, a mixture of a small aperture polybutadiene rubber having a particle diameter of 600–1500 Å, a gel content of 70–95%, and a swelling index of 12–30 and a large aperture polybutadiene rubber latex having a particle diameter of 2600–5000Å, a gel content of 70–95%, and a swelling index of 12–30, and monomers grafted in the mixture of a methacrylic acid or an acrylic acid alkylester compound, an aromatic vinyl compound, and a vinylcian compound.

The particle diameter and gel content of the polybutadiene rubber latex used in the present invention greatly influence properties of the inventive resin composition such as transparency and resistance to shocks. Therefore, particle diameter size and gel content must be suitably controlled to ensure that optimal levels of such properties are realized. That is, in the case of the rubber latex particle size, although transparency is increased with decreases in particle size, shock resistance and fluidity are decreased, whereas the opposite results with increases in particle size. Further, if the gel content of the rubber latex is low, since the monomers undergo significant swelling in the rubber latex during graft reaction, an external particle diameter of the rubber latex is increased. This limits transparency but improves resistance to shocks. Here also, the opposite effect results with increases in the gel content.

Further, a refractive coefficient of the monomer mixture is directly related to transparency of the inventive resin composition. The refractive coefficient is controlled by a mixture ratio of the monomers. That is, since a refractive coefficient of polybutadiene is approximately 1.518, the remaining grafted components must be similar to this level to realize a high level transparency. Refractive coefficients for each component are 1.49 for the methylmethacrylate, 1.59 for the styrene, and 1.518 for the acrylonitrile.

During the graft copolymerization reaction, each component can be added all at once, or each separately (or partially for each component) in a continuous manner. The present invention performs the adding of components using both these methods. This will be described in more detail hereinafter.

A method of manufacturing the thermoplastic transparent resin composition of the present invention will now be described.

1) Manufacture of Polybutadiene Rubber Latex a) Manufacture of small aperture rubber latex 100 parts by weight of 1,3-butadiene, 1–4 parts, by weight of a emulsifying agent, 0.1–0.6 parts by weight of a polymerization initiator, 0.1–1.0 parts by weight of an electrolyte, 0.1–0.5 parts by weight of a molecular weight controlling agent, and 90–130 parts by weight of ion exchange water are added all at once, and reacted at 50–65° C. for 7–12 hours. Next, 0.5–1.2 parts by weight of a molecular weight controlling agent is further added and reacted at 55–70° C. for 5–15 hours, thereby producing small aperture polybutadiene rubber latex having an average particle diameter of 600–1500Å, a gel content of 70–95%, and a swelling index of 12–30.

As the emulsifying agent, it is possible to use one or a mixture of two or more of the following: alkyl aryl sulfonate, alkali methyl alkyl sulfate, sulfonated alkylester, fatty acid soap, and rosin acid alkali salt. As the polymerization initiator, it is possible to use a water soluble persulfate or peroxy compound, or an oxidation-reduction compound. The most suitable water soluble persulfates are sodium and potassium. For a fat soluble polymerization initiator, it is possible to use cumene peroxide, diisopropyl benzene hydroperoxide, azobisisobutyronitrile, tertiary butyl hydroperoxide, paramethane hydroperoxide, and benzoyl peroxide. For the electrolyte, it is possible use one or a mixture of two or more of the following: KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, and $Na_2HPO_4$.

An important factor in determining gel content and the swelling index of the rubber latex is polymerization temperature. The type of initiator used also influences these two characteristics of the rubber latex.

b) Manufacture of large aperture rubber latex (small aperture rubber latex adhesion process)

3.0–4.0 parts by weight of an acetic acid aqueous solution is slowly added over a period of one hour to 100 parts by weight of the small aperture rubber latex having a particle diameter of 600–1500 Å, a gel content of 70–95%, and a swelling index of 12–30, thereby enlarging the particle size. Stirring is then discontinued and a large aperture rubber latex results, the large aperture rubber latex having a particle diameter of 2600–5000 Å, a gel content of 70–95%, and a swelling index of 12–30.

To provide shock resistance to the rubber latex, although it is possible to manufacture the large aperture rubber latex using a direct polymerization method (Japanese Laid-Open Patent No. 56136807), a long reaction time is required and the gel content level that can be obtained is limited with this method. Accordingly, in order to produce a large aperture rubber latex in a short amount of time while maintaining a high gel content, it is preferable, as described above, to first manufacture a small aperture rubber latex having a high gel content, then add an acidic material to the rubber latex to enlarge the particles, thereby producing a large aperture rubber latex.

2) Manufacture of Graft Copolymerization Material

Graft copolymerized in a mixture of 3–15 parts by weight of the small aperture polybutadiene rubber latex and 5–25 parts by weight of the large aperture polybutadiene rubber latex are 40–70 parts by weight of a methacrylic acid alkylester compound or an acrylic acid alkylester compound, 15–30 parts by weight of an aromatic vinyl compound, 1–20 parts by weight of a vinylcian compound, 0.2–0.6 parts by weight of an emulsifying agent, 0.2–0.6 parts by weight of a molecular weight controlling agent, and 0.05 to 0.3 parts by weight of a polymerization initiator.

In the above, a suitable polymerization temperature is 65–80° C., and a suitable polymerization time is 4–7 hours. In the polymerization reaction, it is possible to use methymethacrylate for the methacrylic acid alkylester compound or acrylic acid alkylester compound; for the aromatic vinyl compound, it is possible to use styrene, α-methylstyrene, oethylstyrene, p-ethylstyrene, or vinyl toluene; and for the vinylcian compound, It is possible to use acrylonitrile, methacrylonitrile, or ethacrylonitrile.

As the emulsifying agent used in the polymerization reaction, it is possible to use one or a mixture of two or more of alkyl aryl sulfonate, alkali methyl alkyl sulfate, sulfonated alkylester, fatty acid soap, and rosin acid alkali salt. For the molecular weight controlling agent, tertiary dodecyl mercaptan is, generally used. As the polymerization initiator, it is possible to use an oxidationreduction catalyst realized through a mixture of (a) a peroxide such as cumene peroxide, diisopropyl benzene hydroperoxide, and persulfuric acid salt, and (b) a reducing agent such as sodium formaldehyde sulfoxylate, sodium ethylenediaminetetraacetic, primary iron sulfate, dextrose, pyrroline acid sodium, and sulfurous sodium.

After polymerization is complete, a polymerization conversion rate of the obtained latex is over 98%. An oxidation preventing agent and a stabilizer is then added to the latex, and at a temperature over 80° C., the latex is coagulated using a calcium chloride aqueous solution, after which the latex is desiccated and dried, thereby obtaining a powder.

Stability of the graft copolymerized latex manufactured in the above is determined by measuring a solidification rate (%) using Equation 1 below.

[Equation 1 ]

Solidification (%)=produced solidification wt.(g) in reactor/weight of all rubber and monomers X 100

A solidification rate of over 0.7% is indicative of an extremely low latex stability, and there will occur difficulty in realizing suitable graft copolymerization as a result of the large presence of solid material.

After adding the oxidation preventing agent and stabilizer, pellets are manufactured from the powder using a biaxial extruding mixer at a temperature between 200 and 230° C. The pellets are again extracted to measure properties of the same.

Since the mixture of the monomers in the present invention changes the refraction coefficient in the resulting inventive resin, it is important to obtain a suitable monomer mixture to realize good transparency. That is, since a refractive coefficient of polybutadiene is approximately 1.518, an entire refractive coefficient of the grafted compound must be 1.510–1.526, preferably between 1.513 and 1.521. A refractive coefficient not reaching 1.510 or exceeding 1.527 is not suitable in the present invention.

The present invention is further explained in more detail with reference to the following examples. The invention can be utilized in various ways and is not intended to be confined to the examples.

EXAMPLE 1

I. Manufacture of polybutadiene rubber latex

A) Manufacture of small aperture rubber latex

Added all at once to a nitrogen substituted polymerization autoclave were 110 parts by weight of ion exchange water; 100 parts by weight of 1,3-butadiene as a monomer; 1.2 parts by weight of rosin acid potassium salt as a emulsifying agent; 1.5 parts by weight of oleic acid potassium salt; 0.1 parts by weight of sodium carbonate ($Na_2CO_3$) as electrolyte; 0.5 parts by weight of potassium hydrogen carbonate ($KHCO_3$); and 0.3 parts by weight of tertiary dodecyl mercaptan (TDDM) as a molecular weight controlling agent. Next, a reaction temperature was increased to 55° C., and after adding 0.3 parts by weight of persulfuric acid potassium as an initiator to begin the reaction, reaction was performed for 10 hours. Following this step, 0.05 parts by weight of tertiary dodecyl mercaptan were again added to the mixture, after the same was reacted for 8 hours at 65° C. A rubber latex obtained using this method was analyzed using a method described below.

(1) Gel content and swelling index

After solidifying the rubber latex using diluted acid or metal salt, the rubber latex is washed then dried for 24 hours in a vacuum oven set at 60° C. Subsequently, the obtained rubber lumps are cut in small (approximately 1g) pieces using scissors, and the pieces are put into 100g of toluene then stored in a darkroom at room temperature for 48 hours. After storage, the material is separated into sol and gel, and a gel content and swelling index are measured using Equation 2 and Equation 3 below, respectively. [Equation 2]

Gel content (%) = weight of insoluble portion (gel)/weight of sample X 100

[Equation 3]

Swelling index = weight of swelled gel/weight of gel (2) Particle diameter

Particle diameter is measured by a dynamic laser light scattering method using a Nicomp 370 HPL.

Using the above methods, the gel content of the particle diameter was 90%, the swelling index was 18, and the particle diameter was 1000 Å.

B) Manufacture of large aperture rubber latex (small aperture rubber latex adhesion process)

Added to a reactor were 100 parts by weight of the small aperture rubber latex manufactured above. Next, at a stirring speed of 10 rpm and a temperature of 30° C., 3.5 parts by weight of an acetic acid aqueous solution were slowly added to the small aperture rubber latex over a period of one hour, after which stirring was discontinued and the mixture was left to stand for 30 minutes, thereby completing the manufacture of the large aperture rubber latex. The large aperture rubber latex obtained through an adhesion method in this manner had a particle diameter of 3000 Å, a gel content of 90%, and a swelling index of 17.

II. Manufacture of graft copolymerization material

Added all at once at a temperature of 50° C. to a mixture of 8 parts by weight of the small aperture rubber latex and 10 parts by weight of the large aperture rubber latex were the components of Example 1 shown in Tables 1 and 2, i.e. 90 parts by weight of ion exchange water, 0.2 parts by weight of an oleic acid sodium emulsifying agent, 11.98 parts by weight of methylmethacrylate, 4.52 parts by weight of styrene, 4 parts by weight of acrylonitrile, 0.2 parts by weight of tertiary dodecyl mercaptan, 0.048 parts by weight of pyrophosphoric acid sodium, 0.012 parts by weight of dextrose, 0.001 parts by weight of primary iron sulfate, and 0.04 parts by weight of cumene hydroperoxide. The mixture was reacted while slowly increasing the temperature to 73° C. over a period of 2 hours.

Next, continuously added to the above mixture over a period of 4 hours was an emulsifying agent mixture of 70 parts by weight of ion exchange water, 0.4 parts by weight of an oleic acid sodium emulsifying agent, 35.92 parts by. weight of methylmethacrylate, 13.58 parts by weight of styrene, 12 parts by weight of acrylonitrile, 0.25 parts by weight of tertiary dodecyl mercaptan, 0.048 parts by weight of pyrophosphoric acid sodium, 0.012 parts by weight of dextrose, 0.001 parts by weight of primary iron sulfate, and 0.10 parts by weight of cumene hydroperoxide. The temperature was again increased to 76° C. over a period of one hour to mature the mixture, thereby completing the reaction.

A polymerization conversion rate of the obtained latex was 99.8% and a solidification rate of the same was 0.12%. A powder was obtained by solidifying lo the latex using a calcium chloride aqueous solution then washing the same.

EXAMPLE 2

The same method as in Example 1 was used to manufacture small and large aperture rubber latex, and graft copolymerization material, but a composition ratio for Example 2 shown in Tables 1 and 2 was used instead of that for Example 1.

COMPARATIVE EXAMPLES 1–5

The same method as in Example 1 was used to manufacture small and large aperture rubber latex, and graft copolymerization material, bud a composition ratio for Comparative Examples 1–5 shown in Tables 1 and 2 was used instead of that for Example 1.

COMPARATIVE EXAMPLE 6

The same method as in Example 1 was used to manufacture small aperture rubber latex and graft copolymerization material, but a composition ratio for Comparative Example 6 shown in Tables 1 and 2 was used instead of that for Example 1. Large aperture rubber latex in Comparative Example 6 was manufactured as described below.

Manufacture of large aperture rubber latex (direct polymerization 5 method)

Added all at once to a nitrogen substituted polymerization autoclave were 83 parts by weight of ion exchange water; 100 parts by weight of 1,3-butadiene; 1.2 parts by weight of rosin acid potassium salt as an emulsifying agent; 1.5 parts by weight of oleic acid potassium salt; 0.7 parts by weight of sodium carbonate ($Na_2CO_3$) as electrolyte; 0.8 parts by weight of potassium hydrogen carbonate ($KHCO_3$); and 0.3 parts by weight of tertiary dodecyl mercaptan (TDDM) as a molecular weight controlling agent. Next, a reaction temperature was increased to 65° C., and after adding 0.3 parts by weight of persulfuric acid potassium as an initiator to initiate the reaction, reaction was performed for 45 hours while the temperature was raised to 85° C. A rubber latex obtained using this method was then analyzed, the results of which were a rubber latex having a particle diameter of 3000 A, a gel content of 65%, and a swelling index of 31.

APPLIED EXAMPLE 1

Added to 100 parts by weight of the graft copolymerization material of Example 1 were 0.1 parts by weight of an activator and 0.2 parts by weight of an oxidation preventing material. Next; using a biaxial extruding mixer, pellets were made from the graft copolyrnerization material and added components in a cylinder oven set at 210° C. The pellets were extracted to make samples, and. properties of the samples were measured, results of which are shown in Table 3.

APPLIED EXAMPLES 2–8

The same method as that used in Applied Example 1 was used, but instead of adding the materials to the graft copolymerization material of Example 1, the powder manufactured according to Example 2 and Comparative Examples 1–6 was used for Applied Examples 2–8, respectively. Results of analysis are shown in Table 3.

TABLE 1

| 1st Reaction | Example 1 | Example 2 | Comp. Example 1 | Comp. Example 2 | Comp. Example 3 | Comp. Example 4 | Comp. Example 5 | Comp. Example 6 |
|---|---|---|---|---|---|---|---|---|
| Ion Exch. Water | 90 | 100 | 99 | 91 | 96 | 92 | 90 | 95 |
| Small Apert. Rubber Latex | 8 | 3 | 1 | 4 | 6 | 14 | — | 4 |
| Large Apert. Rubber Latex | 10 | 9 | 9 | 8 | 10 | — | 14 | 10 (direct method) |
| Oleic Acid Sodium | 0.2 | 0.2 | 0.2 | 0.2 | 0.2 | 0.2 | 0.2 | 0.2 |
| Methylmethacrylate | 11.98 | — | — | 15.8 | — | — | 14.38 | 19.2 |
| Styrene | 4.52 | — | — | 3.7 | — | — | 5.63 | 7.47 |
| Acrylonitrile | 4 | — | — | 2.5 | — | — | 2.5 | 2 |
| Tertiary dodecyl mercaptan | 0.2 | — | — | 0.2 | — | — | 0.2 | 0.2 |
| Pyrophosphoric acid sodium | 0.048 | 0.048 | 0.048 | 0.048 | 0.048 | 0.048 | 0.048 | 0.048 |
| Dextrose | 0.012 | 0.012 | 0.012 | 0.012 | 0.012 | 0.012 | 0.012 | 0.012 |
| Primary iron sulfate | 0.001 | 0.001 | 0.001 | 0.001 | 0.001 | 0.001 | 0.001 | 0.001 |
| Cumene hydroperoxide | 0.04 | 0.04 | 0.04 | 0.04 | 0.04 | 0.04 | 0.04 | 0.04 |
| Add. Method | batch | batch | batch | batch | batch | batch | batch | batch |
| Reaction Time | 2 hours | — | — | 2 hours | — | — | 2 hours | 2 hours |

TABLE 2

| 2nd Reaction | Example 1 | Example 2 | Comp. Example 1 | Comp. Example 2 | Comp. Example 3 | Comp. Example 4 | Comp. Example 5 | Comp. Example 6 |
|---|---|---|---|---|---|---|---|---|
| Ion Exch. Water | 70 | 60 | 61 | 69 | 64 | 65 | 70 | 65 |
| Oleic Acid Sodium | 0.6 | 0.4 | 0.35 | 0.42 | 0.5 | 0.5 | 0.4 | 0.5 |
| Methylmethacrylate | 35.92 | 62.13 | 64.8 | 47.4 | 49.68 | 57.6 | 43.12 | 38.4 |
| Styrene | 13.58 | 22.87 | 25.2 | 11.1 | 26.32 | 22.4 | 16.88 | 14.93 |
| Acrylonitrile | 12 | 3 | — | 7.5 | 8 | 6 | 7.5 | 4 |
| Tertiary dodecyl mercaptan | 0.25 | 0.25 | 0.25 | 0.25 | 0.25 | 0.25 | 0.25 | 0.25 |
| Pyrophosphoric acid sodium | 0.048 | 0.048 | 0.048 | 0.048 | 0.048 | 0.048 | 0.048 | 0.048 |
| Dextrose | 0.012 | 0.012 | 0.012 | 0.012 | 0.012 | 0.012 | 0.012 | 0.012 |
| Primary iron sulfate | 0.001 | 0.001 | 0.001 | 0.001 | 0.001 | 0.001 | 0.001 | 0.001 |
| Cumene hydroperoxide | 0.1 | 0.11 | 0.1 | 0.1 | 0.1 | 0.1 | 0.1 | 0.1 |
| Add. Method | Continuous | continuous | continuous | continuous | continuous | continuous | continuous | continuous |
| Reaction Time | 4 hours | 6 hours | 6 hours | 4 hours | 6 hours | 6 hours | 4 hours | 4 hours |

TABLE 2-continued

| 2$^{nd}$ Reaction | Example 1 | Example 2 | Comp. Example 1 | Comp. Example 2 | Comp. Example 3 | Comp. Example 4 | Comp. Example 5 | Comp. Example 6 |
|---|---|---|---|---|---|---|---|---|
| Polymer. Conv. Rate (%) | 99.8 | 99.0 | 99.7 | 99.7 | 99.5 | 99.5 | 99.3 | 99.8 |
| Solidification (%) | 0.12 | 0.10 | 0.10 | 0.10 | 0.15 | 0.10 | 0.10 | 0.10 |

TABLE 3

| | Applied Ex. 1 | Applied Ex. 2 | Applied Ex. 3 | Applied Ex. 4 | Applied Ex. 5 | Applied Ex. 6 | Applied Ex. 7 | Applied Ex. 8 |
|---|---|---|---|---|---|---|---|---|
| Graft copolymerization material | Example 1 | Example 2 | Comp. Example 1 | Comp. Example 2 | Comp. Example 3 | Comp. Example 4 | Comp. Example 5 | Comp. Example 6 |
| Notch Isod Shock Strength ASTM D-256 | 16 | 11 | 7 | 10 | 14 | 3 | 13 | 13 |
| Fluidity Index ASTM D-1238 | 14 | 22 | 25 | 22 | 16 | 16 | 18 | 19 |
| Haze value ASTM D-1003 | 3.5 | 3 | 3.9 | 20 | 24 | 2.4 | 8.8 | 11.2 |
| Chemical Resist. (ethanol solution) (after 14-day storage) | Extremely High | High | Low | High | High | High | High | High |

Although preferred examples of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thermoplastic transparent resin composition comprising:
   3–15 parts by weight of small aperture polybutadiene rubber latex;
   5–25 parts by weight of large aperture polybutadiene rubber latex;
   40–70 parts by weight of a methacrylic acid alkylester compound or an acrylic acid alkylester compound;
   15–30 parts by weight of an aromatic vinyl compound; and
   1–20 parts by weight of a vinylcian compound,
   wherein the small aperture polybutadiene rubber latex has a particle diameter of 600–1500 Å, a gel content of 70–95%, and a swelling index of 12–30, and the large aperture polybutadiene rubber latex has a particle diameter of 2600–5000 Å, a gel content of greater than 80 and not exceeding 95%, and a swelling index of 12–30, wherein the large aperture polybutadiene rubber latex with a gel content of greater than 80 and not exceeding 95% is produced by adhering small aperture polybutadiene rubber latex particles with a gel content of 70–95%, wherein a total refraction coefficient of the composition, excluding the polybutadiene rubber latex, is between 1.510 and 1.526.

2. The resin composition of claim 1 wherein the composition further comprises 0.2–0.6 parts by weight of an emulsifying agent, 0.2–0.6 parts by weight of a molecular weight controlling agent, and 0.05–0.3 parts by weight of a polymerization starter.

3. The resin composition of claim 1 wherein the methacrylic acid alkylester compound and the acrylic acid alkylester compound are methylmethacrylate.

4. The resin composition of claim 1 wherein the aromatic vinyl compound is selected from the group consisting of styrene, α-methylstyrene, o-ethylstyrene, p-ethylstyrene, and vinyl toluene.

5. The resin composition of claim 1 wherein the vinylcian compound is selected from the group consisting of acrylonitrile, methacrylonitrile, and ethacrylonitrile.

6. A method of manufacturing a thermoplastic transparent resin composition comprising the steps of:
   (a) producing a small aperture polybutadiene rubber latex having an average particle diameter of 600–1500 Å, a gel content of 70–95%, and a swelling index of 12–30 by reacting butadiene at 55–70° C. using a polymerization initiator;
   (b) producing a large aperture polybutadiene rubber latex having a particle diameter of 2600–5000 Å, a gel content of greater than 80 and not exceeding 95%, and a swelling index of 12–30 by adhering the small aperture polybutadiene rubber latex particles; and
   (c) performing graft copolymerization at 65–80° C. by continuously or separately adding 3–15 parts by weight of the small aperture polybutadiene rubber latex of step (a), 5–25 parts by weight of the large aperture polybutadiene rubber latex of step (b), 40–70 parts by weight of a methacrylic acid alkylester compound or an acrylic acid alkylester compound, 15–30 parts by weight of an aromatic vinyl compound, and 1–20 parts by weight of a vinylcian compound, wherein a total refraction coefficient of the composition, excluding the polybutadiene rubber latex, is between 1.510 and 1.526.

7. The method of claim 6 wherein the methacrylic acid alkylester compound and the acrylic acid alkylester compound are methylmethacrylate.

8. The method of claim 6 wherein the aromatic vinyl compound is selected from the group consisting of styrene, α-methylstyrene, o-ethylstyrene, p-ethylstyrene, and vinyl toluene.

9. The method of claim 6 wherein the vinylcian compound is selected from the group consisting of acrylonitrile, methacrylonitrile, and ethacrylonitrile.

* * * * *